(12) United States Patent
Kim et al.

(10) Patent No.: US 11,719,833 B2
(45) Date of Patent: Aug. 8, 2023

(54) RADON MEASURING APPARATUS AND METHOD

(71) Applicant: ARIM SCIENCE CO., Daejeon (KR)

(72) Inventors: Sang In Kim, Daejeon (KR); Hyun Keun Lim, Daejeon (KR); Eun Jung Yun, Changwon-si (KR)

(73) Assignee: ARIM SCIENCE CO., Daejeon (KR)

( * ) Notice: Subject to any disclaimer, the term of this patent is extended or adjusted under 35 U.S.C. 154(b) by 0 days.

(21) Appl. No.: 17/832,641

(22) Filed: Jun. 4, 2022

(65) Prior Publication Data

US 2022/0299660 A1     Sep. 22, 2022

Related U.S. Application Data

(63) Continuation of application No. PCT/KR2020/003687, filed on Mar. 18, 2020.

(30) Foreign Application Priority Data

Dec. 19, 2019   (KR) .......................... 10-2019-0170936

(51) Int. Cl.
*G01T 1/178*     (2006.01)
*G01T 7/04*      (2006.01)

(52) U.S. Cl.
CPC ............... *G01T 1/178* (2013.01); *G01T 7/04* (2013.01)

(58) Field of Classification Search
CPC .................................. G01T 1/178; G01T 7/04
See application file for complete search history.

(56) References Cited

U.S. PATENT DOCUMENTS 5,898,374 A     4/1999   Schepka

FOREIGN PATENT DOCUMENTS

| KR | 20-0258780 Y1 | 12/2001 | |
|---|---|---|---|
| KR | 10-2017-0001194 A | 1/2017 | |
| KR | 10-2017-0023599 A | 3/2017 | |
| KR | 10-2014771 B1 | 8/2019 | |
| WO | WO-2019208900 A1 * | 10/2019 | ............. G01T 1/178 |
| WO | WO-2022092708 A1 * | 5/2022 | |

OTHER PUBLICATIONS

International Search Report dated Sep. 3, 2020 for International Application No. PCT/KR2020/003687 and its English translation.

* cited by examiner

*Primary Examiner* — David P Porta
*Assistant Examiner* — Fani Polyzos Boosalis
(74) *Attorney, Agent, or Firm* — Insight Law Group, PLLC; Seung Lee

(57) ABSTRACT

Disclosed are a radon measuring apparatus and method. A radon measuring apparatus according to the present invention can comprise: a housing having two separate spaces and through holes formed such that each space communicates with the outside; a probe unit having first and second probe rods which are respectively disposed inside each space in the opposite direction from each other inside the housing; a control unit disposed inside the housing and connected to the probe unit; and a switching unit for controlling the electrical connection between the first and second probe rods.

10 Claims, 6 Drawing Sheets

Fig. 4
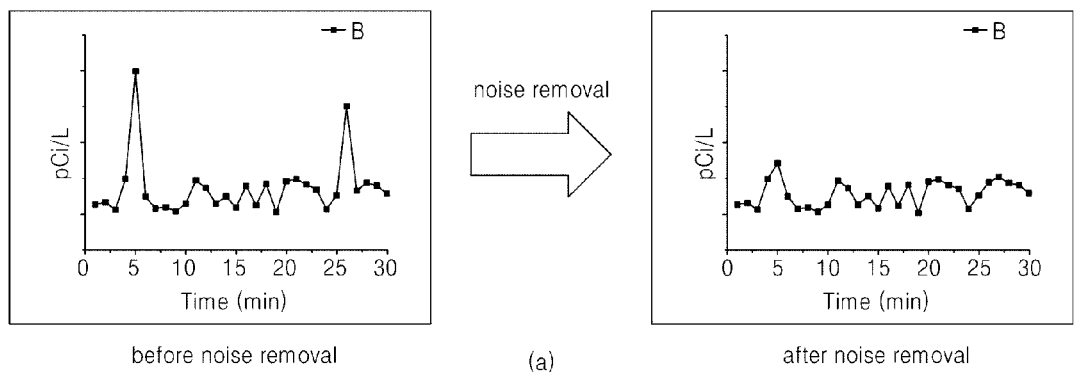
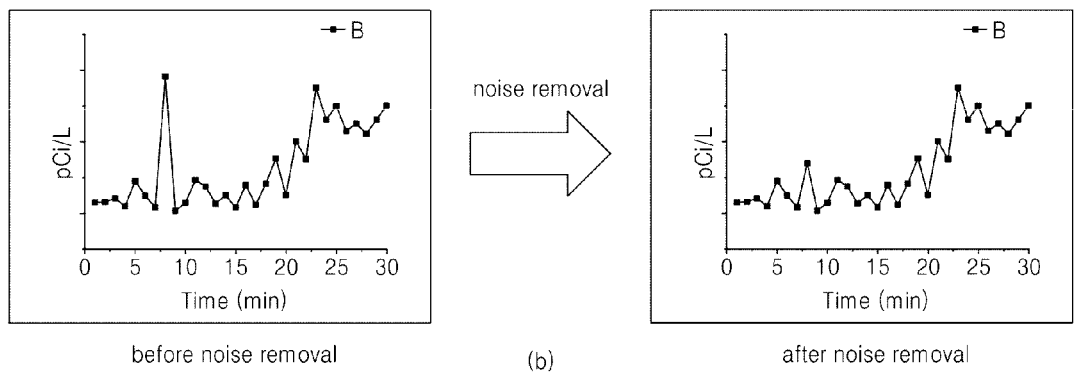
Fig. 5
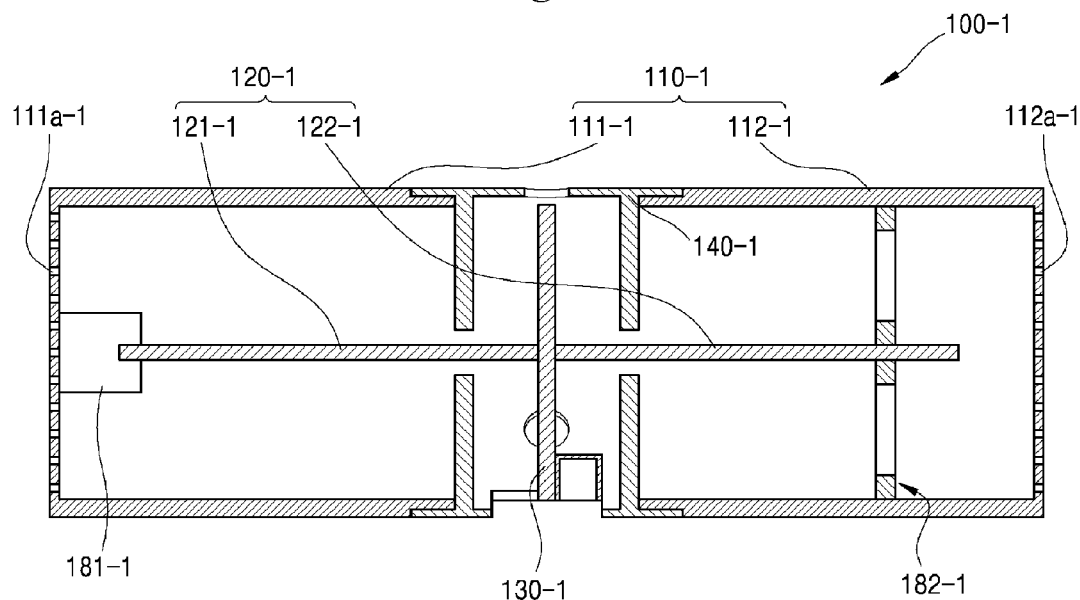

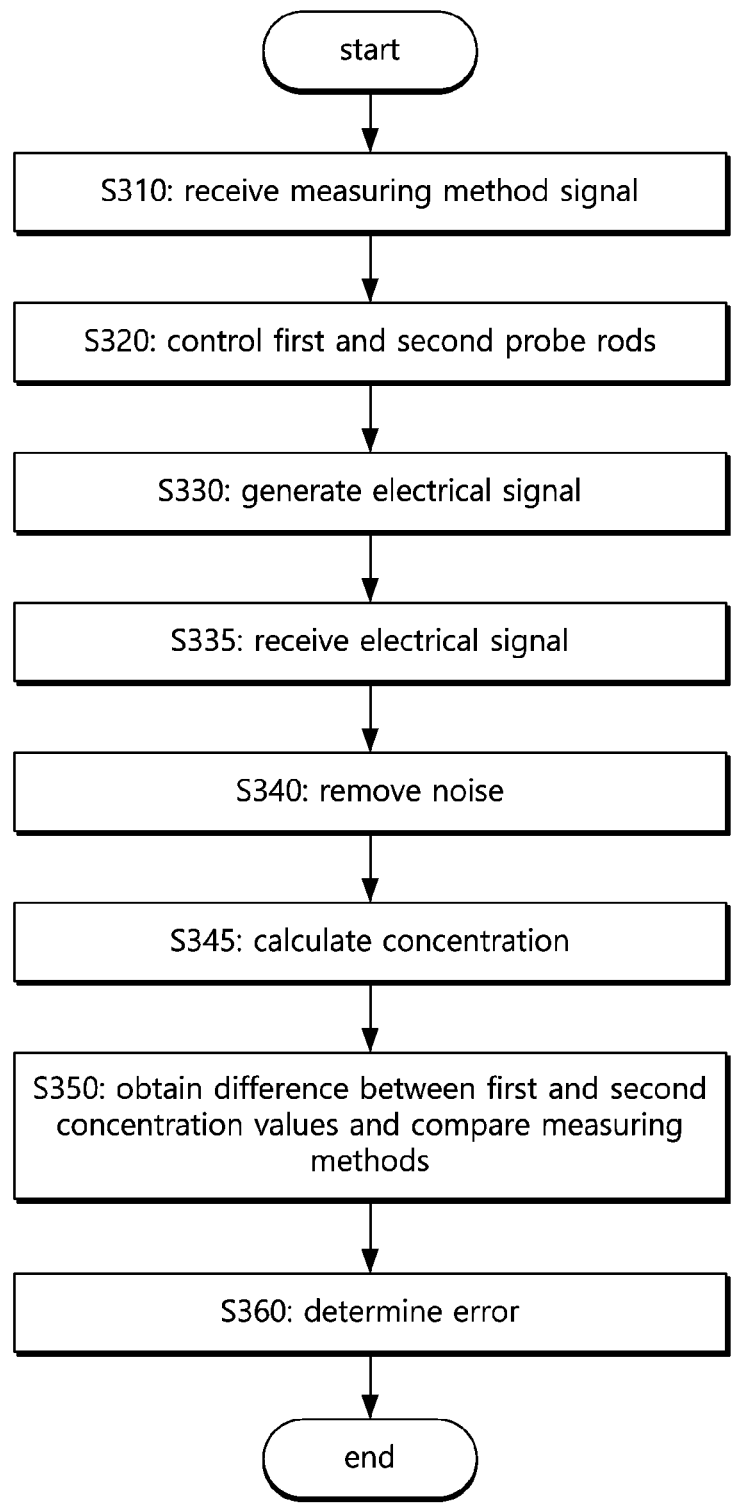

RADON MEASURING APPARATUS AND METHOD

CROSS-REFERENCE TO RELATED APPLICATIONS

The present application is a continuation application of International Application No. PCT/KR2020/003687, filed Mar. 18, 2020, which claims priority from and benefit of Korean Patent Application No. 10-2019-0170936, filed Dec. 19, 2019, the disclosures of which are incorporated by reference herein in their entirety.

TECHNICAL FIELD

Embodiments of the present invention relate to an apparatus and method, and more particularly, to a radon measuring apparatus and method.

BACKGROUND ART

Radon-222 (Rn-222) is a natural radioactive gas with a half-life of 3.8 days. Radon is a decay product of radium-226 (Ra-226, half-life of 1600 years) that is a member of the uranium-238 decay chain. Uranium and radium are present naturally in rocks and soil, and constant sources of radon. Radon gas is emitted from the Earth's crust, and hence is present in outdoor air and in the air of buildings including workplaces. There are large variations in radon concentration in indoor air due to the factors that affect the pressure difference between indoors and outdoors, such as mainly local geology, ventilation rate, building heating, and weather conditions.

Since radon gas is inert, almost all of the inhaled radon is exhaled. However, radon-222 decays into a series of short-lived radionuclides, and when its progenies, polonium and bismuth (Po-218, Po-214, and Bi-214), are inhaled, they are deposited in the respiratory organs. Airborne radon progeny form aerosol compounds in two steps. After radon gas decays, newly formed radionuclides (Po-218, Pb-214, Bi-214) interact rapidly (<1 second) with trace gases or aerosol, forming clusters to form particles with a dimension of approximately 1 nm. These particles are referred to as "unattached particles." The unattached particles are attached to the existing aerosol particles in the air again within 1 to 100 seconds to form "attached particles." At this time, the probability that the progeny of radon-222 will adhere to the aerosol particles is approximately 40% (ICRP Publication 115, 2011). These unattached particles and attached particles adhere to the respiratory tract. The attached radon progeny decays before being eliminated from the lungs, mainly due to their short half-life (less than 30 minutes). Of the short-lived radon progenies, polonium-218 and polonium-214 both emit alpha particles, which dominantly contribute to lung dose and the resulting lung cancer risk.

Thoron (Rn-220) gas is a decay product of radium-224 (Ra-224) and is part of the thorium-232 (Th-232) decay chain. Thoron has a short half-life (56 seconds) and undergoes alpha decay into polonium-216 (half-life of 0.14 seconds), lead-212 (10.6 hours), bismuth-212 (61 minutes), and polonium-212 (less than 0.000001 seconds) and finally into lead-208. Thoron cannot escape from the point of origin as easily as Radon due to its short half-life. Thus, the most common source of indoor thoron exposure is building materials. As in radon, an alpha particle from thoron progeny decay contributes to the dose from inhalation of thoron and thoron progeny. Due to the short half-life of thoron, the level of radioactivity of thoron gas may vary even in the same room, and hence the concentration of thoron gas cannot be used for assessment of dose in a space.

Methods of measuring the concentration of radon in the air may include passive measurement methods using adsorption activated carbon and active measurement methods using a scintillation cell, an ion chamber, a PIN diode, and the like.

Among the active measurement methods, a scintillation cell (ZnS:Ag) detector has very high measurement sensitivity and is capable of nuclide analysis, but is expensive and has short durability due to degradation of fluorescent materials.

A PIN diode detector provides a proportion measure of radon based on the change in the amount of charge by colliding polonium ions, which are produced from the alpha-decay of radon, with the surface of a diode according to the internal electric field. The PIN diode detector is capable of distinguishing between radon-222 and radon-220 and of analyzing radon progeny and provides high durability, but has low measurement sensitivity and high sensitivity to humidity.

DETAILED DESCRIPTION OF THE INVENTION

Technical Problem

Embodiments of the present invention are to provide a radon measuring apparatus and method.

Technical Solution

A radon measuring apparatus according to an embodiment of the present invention may include a housing having two separate spaces and through holes formed such that each space communicates with the outside; a probe unit having first and second probe rods which are respectively disposed inside each space in the opposite direction from each other inside the housing; a control unit disposed inside the housing and connected to the probe unit; and a switching unit for controlling the electrical connection between the first and second probe rods.

In addition, the radon measuring apparatus may further include a shielding unit having the control unit accommodated therein to electrically shield the control unit and having a communication hole communicating with the outside, wherein the housing may have a first housing having one end coupled to the shielding unit and the other end in which a first through hole is formed, and having the first probe rod disposed therein; and a second housing disposed symmetrically with the first housing with respect to the shielding unit, having one end coupled to the shielding unit and the other end in which a second through hole is formed, and having the second probe rod disposed therein.

In addition, the radon measuring apparatus may further include a first filter unit disposed in the first through hole; and a second filter unit disposed in the second through hole, wherein any one of a fine filter having a pore size through which radon progeny passes and an ultrafine filter having a pore size smaller than the pore size of the fine filter and allowing radon to pass therethrough may be installed on each of the first and second filter units according to a user's selection.

In addition, the radon measuring apparatus may further include a transceiver unit configured to receive a measuring method in accordance with whether the fine filter or the ultrafine filter is installed on each of the first and second filter units from an external device, wherein the control unit may set a measuring method to any one of a first measuring method in which a concentration of radon is measured, a second measuring method in which a concentration of radon and a combined concentration of radon and its progeny are each measured, and a third measuring method in which the combined concentration is measured, according to the received measuring method.

In addition, when the set measuring method is any one of the first and third measuring methods, the control unit may control the switching unit to electrically connect the first and second probe rods, and when the set measuring method is the second measuring method, the control unit may control the switching unit to electrically insulate the first and second probe rods.

In addition, the control unit may determine whether there is an error, based on a difference between a first concentration value calculated through the first probe rod and a second concentration value calculated through the second probe rod and the set measuring method.

In addition, there may be the error when the difference between the first and second concentration values is greater than a first set value and the set measuring method is one of the first and third measuring methods, or when the difference between the first and second concentration values is smaller than a second set value and the set measuring method is the second measuring method.

In addition, the radon measuring apparatus may further include a support unit disposed inside the housing and configured to support the probe unit.

Further, the support unit may include at least one of a first support unit having one end disposed at the end of the first housing in which the first through hole is formed, and the other end protruding toward the inside of the first housing, and having a fixing groove formed at a central portion of the protruding other end into which an end of the first probe rod is inserted, or a second support unit having an annular shape, a through hole through which the second probe rod penetrate, and a support body unit supporting an inner wall of the second housing.

A radon measuring method according to an embodiment of the present invention may include receiving a measuring method; and, in accordance with the received measuring method, controlling the electrical connection between first and second probe rods which are respectively disposed inside first and second housings disposed on both sides of a shielding unit that accommodates a control unit therein and electrically shields the control unit.

Advantageous Effects

Embodiments of the present invention enable an accurate and real-time measurement of the concentrations of radon and radon progeny in the air.

Embodiments of the present invention enable a precise and accurate measurement of the concentrations of radon and radon progeny without external influences.

BRIEF DESCRIPTION OF DRAWINGS

FIG. 4 is a graph showing removal of noise from a signal of the radon measuring apparatus shown in FIG. 1.

FIG. 5 is a cross-sectional view showing a radon measuring apparatus according to another embodiment of the present invention.

FIG. 8 is a flowchart of a radon measuring method according to an embodiment of the present invention.

MODE FOR INVENTION

Figure 1:
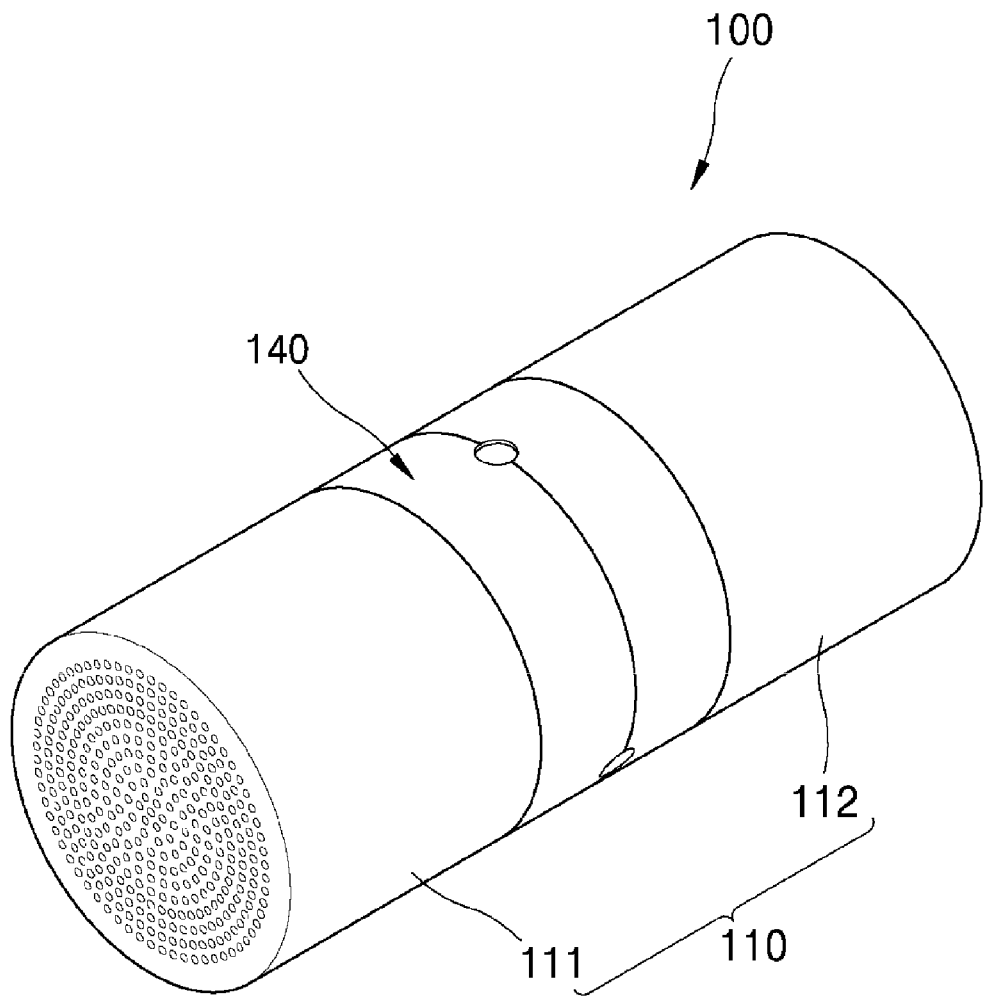
FIG. 1 is a perspective view showing a radon measuring apparatus according to an embodiment of the present invention.

As the invention allows for various changes and numerous embodiments, particular embodiments will be illustrated in the drawings and described in detail in the written description. The attached drawings for illustrating exemplary embodiments are referred to in order to gain a sufficient understanding of the effects and features thereof, and methods for accomplishing the effects and features thereof. The present invention, however, can be embodied in different forms and should not be construed as being limited to the embodiments set forth herein.

Hereinafter, the present invention will be described in detail with reference to the accompanying drawings. In addition, in the present specification and drawings, like reference numerals refer to like elements throughout, and thus, redundant descriptions are omitted.

In the following embodiments, the terms "first" and "second" are for differentiating one element from another element, and these elements should not be limited by these terms.

In the following embodiments, the singular forms "a," "an" and "the" are intended to include the plural forms as well, unless the context clearly indicates otherwise.

In the following embodiments, it should be further understood that the terms "comprises," "comprising," "has," "having," "includes" and/or "including," when used herein, specify the presence of stated features, integers, steps, operations, elements, and/or components, but do not preclude the presence or addition of one or more other features, integers, steps, operations, elements, components, and/or groups thereof.

Also, when an element such as a layer or a region, is referred to as being "on" another element, this includes a case where one element is formed between other elements, in addition to a case where one element is formed directly on the other element.

It will be understood that when an element is "connected to" or "coupled with/to" to another element, the element may be directly connected or coupled to another element, and there may be an intervening element between the element and another element. On the other hand, it will be understood that when an element is "directly connected" or "directly coupled" to another element, there is no intervening element between the element and another element. In addition, it is understood that when a first element is connected to or accesses a second element in a network, the first element and the second element can transmit and receive data therebetween.

In the drawings, the dimensions of layers and regions are exaggerated or reduced for clarity of illustration. For example, a dimension and thickness of each element in the drawings are arbitrarily illustrated for clarity, and thus, the present invention is not limited thereto.

In the following embodiments, the x-axis, the y-axis and the z-axis are not limited to three axes of the rectangular coordinate system, and can be interpreted in a broader sense. For example, the x-axis, the y-axis, and the z-axis can be perpendicular to one another, or can represent different directions that are not perpendicular to one another.

When a certain embodiment can be implemented differently, a specific process order can be performed differently from the described order. For example, two consecutively described processes can be performed substantially at the same time or performed in an order opposite to the described order.

Figure 2:
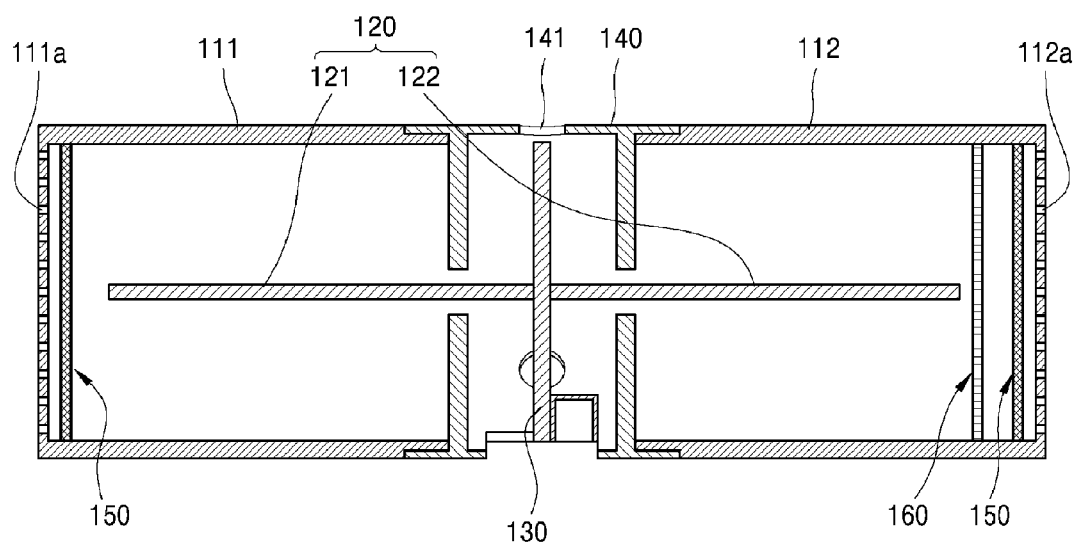
FIG. 2 is a cross-sectional view showing the radon measuring apparatus shown in FIG. 1.
Figure 3:
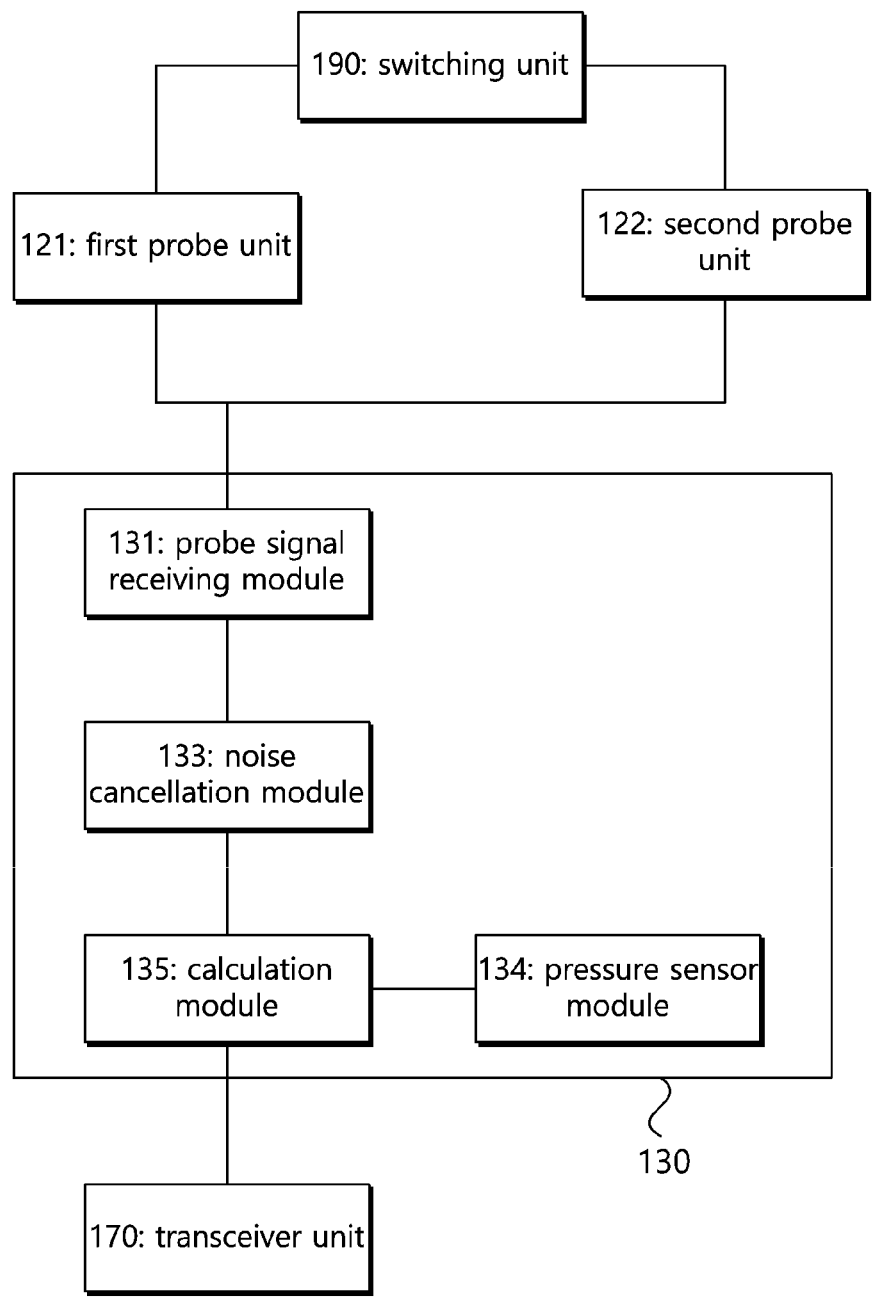
FIG. 3 is a block diagram illustrating the radon measuring apparatus shown in FIG. 1.

FIG. 1 is a perspective view showing a radon measuring apparatus according to an embodiment of the present invention, FIG. 2 is a cross-sectional view showing the radon measuring apparatus shown in FIG. 1, FIG. 3 is a block diagram illustrating the radon measuring apparatus shown in FIG. 1, and FIG. 4 is a graph showing removal of noise from a signal of the radon measuring apparatus shown in FIG. 1.

Referring to FIGS. 1 to 4, a radon measuring apparatus 100 may include a housing 110, a probe unit 120, a control unit 130, a shielding unit 140, a first filter unit 150, a second filter unit 150, and a transceiver unit 170.

The housing 110 may have two spaces therein. Here, the housing 110 may have first and second housings 111 and 112 disposed to be spaced apart from each other. The first and second housings 111 and 112 correspond to each other and may be identical or similar to each other. Hereinafter, for convenience of explanation, a detailed description will be given focusing on the first housing 111.

The first housing 111 may be formed such that one side thereof is open, and may have a space formed therein. The first housing 111 may have at least one first through hole 111a on an outer surface thereof. In particular, the first through hole 111a may be disposed only at an end of the first housing 111. A plate forming the first through hole 111a may serve as a lid covering the opening of the first housing 111.

The first housing 111 may have various shapes. For example, the first housing 111 may have a cylindrical shape or a polygonal column shape.

The first housing 111 may include a conductive material. For example, the first housing 111 may be made of, include, or be coated with metal, conductive plating plastic, or the like.

The second housing 112 may correspond to the first housing 111 and have a second through hole 112a.

The control unit 130 may control a bias voltage to be applied to the first and second housings 111 and 112. The bias voltages applied to the first and second housings 111 and 112 may have preferably the same magnitude.

The probe unit 120 may detect electrical signals of alpha particles of radon. The probe unit 120 may be electrically connected to the control unit 130. The probe unit 120 and the control unit 130 may be directly connected to each other. In this case, when compared to a case where the probe unit 120 is connected to the control unit 130 through other members, the electrical resistance may be minimized and the influence of noise may be reduced. Accordingly, when a signal sensed by the probe unit 120 is transmitted to the control unit 130, the signal loss of the probe unit 120 may be minimized. The probe unit 120 may include an insulating material. Such an insulating material may separate the probe unit 120 into two or more conductors.

In one embodiment, the probe unit 120 may have a single probe rod connected to the control unit 130. The single probe rod may be a probe rod in which first and second probe rods 121 and 122, which will be described below, are integrally formed.

In another embodiment, the probe unit 120 may have first and second probe rods 121 and 122 respectively connected to the control unit 130. The first and second probe rods 121 and 122 may have any one of a structure in which they are electrically connected to each other, a structure in which they are insulated from each other, and a structure in which an electrical connection or insulation can be selected.

When the first and second probe rods 121 and 122 has the structure in which they are insulated from each other, the first and second probe rods 121 and 122 may be insulated by a substrate or the like of the control unit 130, or may be insulated from each other by placing a separate insulator therebetween.

When the first and second probe rods 121 and 122 has the structure in which they are selectively turned on, the first and second probe rods 121 and 122 may be selectively electrically controlled (turn on/off) by a switch or the like in addition to the insulating structure described above.

Hereinafter, unless otherwise specified, a description will be given assuming that the first and second probe rods 121 and 122 are insulated by a switching unit 190 or separated without the switching portion 190.

The first and second probe rods 121 and 122 may be respectively disposed in the inner spaces of the first and second housings 111 and 112. In this case, it is preferable that the first probe rod 121 and the first housing 111 are electrically insulated from each other and the second probe rod 122 and the second housing 112 are electrically insulated from each other.

The control unit 130 may be electrically connected to the probe unit 120. The control unit 130 may be interposed between the first and second housings 111 and 112. In this case, the control unit 130 may be formed in the form of a circuit board. The control unit 130 may include various elements. For example, the control unit 130 may include a probe signal receiving module 131 configured to receive a signal measured by the probe unit 120 and a noise cancellation module 133 configured to remove noise from the received signal. In addition, the control unit 130 may further include a calculation module 135 that performs a calculation on a removed noise signal.

The probe signal receiving module 131 may be a wire such as a cable, and may further include an amplifier that amplifies a signal. The probe signal receiving module 131 may be the noise cancellation module 133 itself.

The noise cancellation module 133 may include a differential circuit (not shown) that removes noise by performing inversion-non-inversion differential cancellation on an input signal. In addition, the noise cancellation module 133 may include a noise cancellation circuit (not shown) that accumulates a signal from which noise has been removed through the differential circuit for a predetermined period of time (e.g., approximately 5 minutes to 10 minutes) and then removes a signal that is not continuously repeated from the input signal. In this case, when a signal having a level higher than the average level of the accumulated signal by a predetermined extent or more appears in the input signal, the noise cancellation circuit may determine that the signal is noise, and remove it. In other words, as shown in FIG. 4, in a case where a signal having an abnormally abruptly rising peak value is included in the input signal, when it is determined that the level of the signal is greater than the average level of the accumulated signal by a predetermined extent or more, the signal is determined to be noise and removed.

The calculation module 135 may calculate each value based on the signal from which noise is removed by the noise cancellation module 133. For example, the calculation module 135 may determine the level of radon in the air, the level of radon progeny, or the presence or absence of radon progeny based on the signal from which noise is removed.

The radon measuring apparatus 100 may further include the switching unit 190 configured to electrically turn on/off the first and second probe rods 121 and 122. The switching unit 190 may electrically connect or disconnect the first and second probe rods 121 and 122 in accordance with an instruction of the control unit 130.

The shielding unit 140 may be disposed between the first and second housings 111 and 112 to couple the first and second housings 111 and 112 to each other. In this case, a thread is formed on an outer surface of each of the first and second housings 111 and 112, and corresponding threads may be formed on an inner surface of the shielding unit 140 so that the first and second housings 111 and 112 and the shielding unit 140 may be coupled to each other. In another embodiment, threads may be formed on an outer surface of the shielding unit 140 and a thread is formed on an inner surface of each of the first and second housings 111 and 112 so that they may be coupled to each other.

The shielding unit 140 may have a space formed therein. The control unit 130 may be disposed in the space formed inside the shielding unit 140. In this case, the shielding unit 140 may have holes through which the first and second probe rods 121 and 122 are inserted. Inner surfaces of the holes may not be in contact with the first and second probe rods 121 and 122. In another embodiment, a separate insulating member may be disposed between the hole and the first probe rod 121 and between the hole and the second probe rod 122 to prevent the first and second probe rods 121 and 122 and the shielding unit 140 from being electrically connected to each other.

The shielding unit 140 is preferably formed of a conductive material or coated with a conductive material for noise shielding. The shielding unit 140 may be formed of the same conductive material as the first and second housings 111 and 112.

The control unit 130 may transmit power applied by a power supply unit (not shown) to the first and second housings 111 and 112. A signal line connecting the control unit 130 and the power supply unit and connection members connecting the power supply unit and the first and second housings 111 and 112 may each be preferably insulated from the shielding unit 140. The control unit 130 may be disposed inside the shielding unit 140 to shield the control unit 130 from external noise.

The shielding unit 140 may include a communication hole 141 formed on a side surface thereof through which internal air passes to the outside. The communication hole 141 may transmit heat generated in the control unit 130 and the like to the outside. Here, it is preferable that the communication hole 141 is sufficiently small. This is because, as the communication hole 141 becomes smaller, it is possible to further prevent external electrical noise from being transmitted to the control unit 130.

A power source of the radon measuring apparatus 100 may be an external power source disposed outside the shielding unit 140. In this case, the shielding unit 140 may have a connection hole through which the control unit 130 and the external power source pass into the shielding unit 140. A cable for connecting an external device (including the external power source), the control unit 130, and the like may be inserted into the connection hole.

In this embodiment, all components of the control unit 130 are illustrated as being disposed inside the housing 110, but the embodiments of the present invention are not limited thereto. For example, some components of the control unit 130 may be disposed inside the housing 110, and the other components may be disposed outside the shielding unit 140. For example, only the probe signal receiving module 131 may be disposed inside the shielding unit 140, and the other components may be disposed outside the shielding unit 140.

The first and second filter units 150 and 160 may be disposed inside the housing 110. For example, the first filter unit 150 may be disposed inside at least one of the first and second housings 111 and 112. Hereinafter, for convenience of explanation, a detailed description will be given focusing on a case in which the first filter unit 150 is disposed inside the first housing 111 and the second filter unit 160 is disposed inside the second housing 112.

The first filter unit 150 may be formed in a mesh form. In this case, the first filter unit 150 can remove large-sized dust in the air. Accordingly, the probe unit 120 may be prevented from malfunctioning or noise generation due to large-sized dust.

The first filter unit 150 may be preferably disposed on the open side of the first housing 111. The first filter unit 150 may preferably include a fine filter having a pore size through which radon and radon progeny pass. Thus, radon and its progeny may be present in the first housing 111 in which the first filter unit 150 is disposed.

The second filter unit 160 may have pores smaller than the pores of the first filter unit 150. For example, the second filter unit 160 may include an ultrafine filter (HEPA filter, etc.) capable of removing aerosols. In this case, the second filter 160 removes radon progeny adsorbed on aerosols, so that radon may be present in the housing 110, but radon progeny may not be present in the housing 110.

The first and second filter units 150 and 160 may have different filters, one of which has larger pores than the other, as described above, and alternatively, the first and second filter units 150 and 160 may be formed as the same filters. For example, the first and second filter units 150 and 160 may be fine filters having a pore size through which radon progeny can pass. In another embodiment, the first and second filter units 150 and 160 may be ultrafine filters that radon progeny cannot pass through.

In addition, the first and second filter units 150 and 160 may be replaced in various combinations according to the measuring method of the radon measuring apparatus 100. The radon measuring apparatus 100 that may provide various measuring methods may further include the switching unit 190 to control the electrical connection between the first and second probe rods 121 and 122. In the following description of the measuring method, the first and second probe rods 121 and 122 may be controlled by the switching unit 190.

Various measuring methods may be implemented depending on the combination according to the types of filters disposed in the first and second filter units 150 and 160.

A first measuring method may precisely and/or accurately only the radon concentration. The first measuring method may be implemented when the first and second filter units 150 and 160 are ultrafine filters and the first and second housings 111 and 112 are turned on by the switching unit 190.

The first and second filter units 150 and 160 have the ultrafine filters, so that only radon can pass inside the first and second housings 111 and 112. This case may correspond to a case in which radon is measured in a chamber in a cylindrical shape having a diameter equal to the diameter of the first and second housing 111 and 112 and a length equal to the sum of the lengths of the first and second housings 111 and 112.

In order to measure the concentration of fissile material by using the degree of ionization of air according to fission of the material, an ionization chamber having a hollow cylindrical shape with one side open is generally used. If the ionization chamber is increased in volume, a large amount of fissile material can be disposed and thus the concentration of the material can be precisely measured.

If the ionization chamber of a predetermined size is increased only in length (height) in order to increase the volume of the chamber, it is difficult for radon to enter to a close end, which is opposite to the open end of the chamber. Thus, there is no point in increasing the volume of the chamber. In other words, if the ratio of the length to the diameter of the cylindrical chamber is much greater than the length/diameter ratio at the time of measurement of the normal concentration, a dead zone may occur in which fission of radon cannot be measured.

To allow radon to enter to the closed end of the chamber while making the length of the chamber longer, the diameter of the chamber is required to be increased. As the diameter of the chamber is increased, a higher bias voltage should be provided to the chamber. This allows a voltage between the internal probe unit and the chamber to change through an ionized path according to fission.

According to the present embodiment, the first and second housings 111 and 112 may correspond to a hollow cylindrical chamber with both sides open. In other words, since it is not necessary to increase the diameter of the cylinder to correspond to the length of the cylinder while increasing the volume of the cylinder by elongating the length, a high bias voltage is not required. In addition, since the diameter (cross-section area) of the cylinder does not increase, it may be advantageous in terms of miniaturization and portability.

The second measuring method may simultaneously measure the radon concentration and the concentration of radon progeny. The second measuring method may be implemented when the first filter unit 150 is a fine filter, the second filter unit 160 is an ultrafine filter, and the first and second probe rods 121 and 122 are insulated by the switching unit 190.

The control unit 130 may measure the concentration of radon and its progeny (hereinafter will be referred to as a "combined concentration") through the first probe rod 121 disposed inside the first housing 111 that radon and its progeny can pass through. The control unit 130 may measure the radon concentration through the second probe rod 122 disposed inside the second housing 112 that radon can pass through. The radon concentration according to the first measuring method may be more precise or accurate than the radon concentration according to the second measuring method.

A third measuring method may precisely measure the combined concentration of radon and its progeny. The third measuring method may be implemented when the first and second filter units 150 and 160 are fine filters and the first and second housings 111 and 112 are turned on by the switching unit 190. The basic principle of the third measuring method corresponds to that of the first measuring method, and thus a detailed description thereof will be omitted.

The measuring methods and the specific filters to be installed are not limited to the above examples. For example, when the combined concentration is measured, the fine filter may not be provided.

The transceiver unit 170 may be connected to the control unit 130 to transfer a signal processed in the control unit 130 to an external device or to transmit a signal of the external device to the control unit 130. At this time, the transceiver unit 170 may connect the control unit 130 wired or wirelessly to the external device.

The external device may be a variety of devices, such as a smartphone, a portable terminal, a mobile terminal, a personal digital assistant (PDA), a portable multimedia player (PMP) terminal, a telematics terminal, and a navigation terminal, a personal computer (PC), a notebook computer, a slate PC, a tablet PC, an Ultrabook, a wearable device (including, for example, a smartwatch, smart glasses, a head mounted display (HMD), etc.), a Wibro terminal, an Internet protocol television (IPTV) terminal, a smart TV, digital broadcasting terminal, an audio video navigation (AVN) terminal, an audio/video (A/V) system, a flexible terminal, and the like.

The control unit 130 may set a measuring method to one of the first to third measuring methods in response to a control signal of the external device received from the transceiver unit 170, and control the first and second probe rods 121 and 122 by manipulating the switching unit 190 according to the set measuring method.

Although the transceiver unit 170 has been described as transmitting and receiving signals to and from the external device, the transceiver unit 170 may provide a function of an input module of a user interface that receives a user's input and/or an output module that provides information to the user, or may function only as an input/output module without a transmission/reception function. In this case, the input/output module itself may be considered as an external device.

The control unit 130 may further include a pressure sensor module 134. In this case, the pressure sensor module 134 may transmit a measured pressure to the control unit 130, and the calculation module 135 may correct the measured concentration based on the pressure measured by the pressure sensor module 134. For example, the calculation module 135 may determine a correction factor from 0.9 to 1.1 based on the pressure measured by the pressure sensor module 134 and correct the concentration according to the pressure by multiplying the calculated concentration by the correction factor. The control unit 130 may further include various sensors in addition to the pressure sensor module 134 to correct measurement errors caused by external environmental factors, such as temperature, humidity, vibration, and the like.

Figure 6:
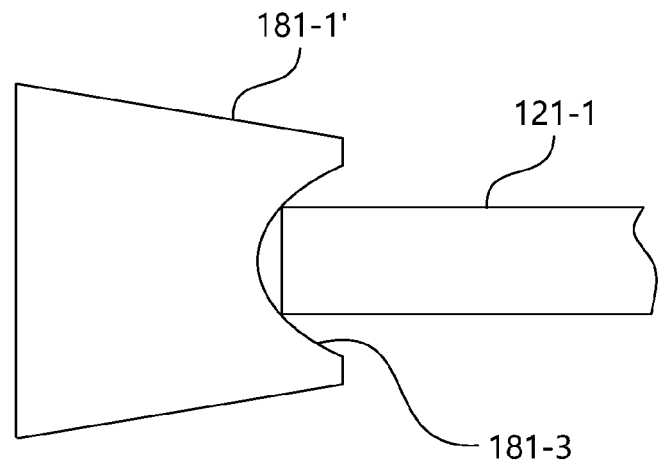
FIG. 6 is a cross-sectional view showing one embodiment of a support unit shown in FIG. 5.
Figure 7:
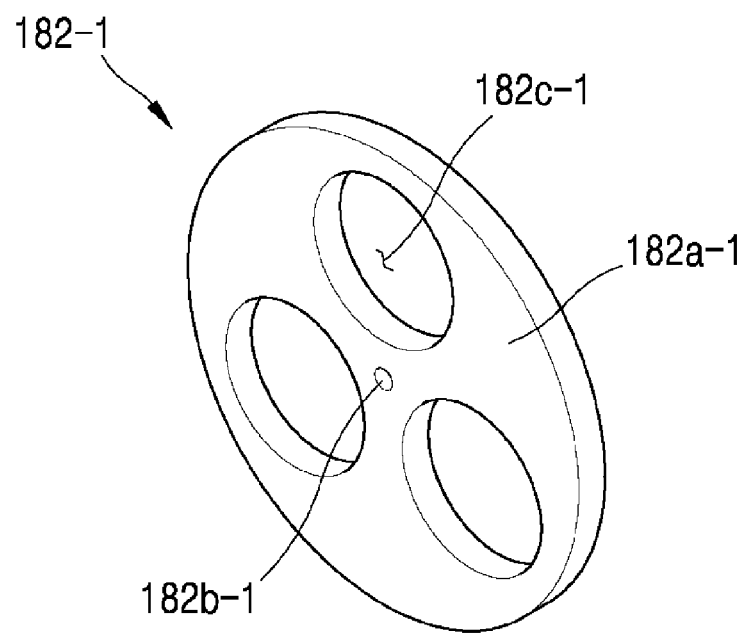
FIG. 7 is a perspective view showing another embodiment of the support unit shown in FIG. 5.

FIG. 5 is a cross-sectional view showing a radon measuring apparatus according to another embodiment of the present invention. FIG. 6 is a cross-sectional view showing another embodiment of a support unit shown in FIG. 5. FIG. 7 is a perspective view showing the support unit shown in FIG. 5.

Referring to FIGS. 5 to 7, a radon measuring apparatus 100-1 may include a housing 110-1, a probe unit 120-1, a control unit 130-1, a shielding unit 140-1, a transceiver unit (not shown), and a support unit 180-1. Here, the housing 110-1, the probe unit 120-1, the control unit 130-1, the shielding unit 140-1, and the transceiver unit are the same as or similar to those described above, and thus detailed descriptions thereof will be omitted.

The support unit 180-1 may support the probe unit 120-1. In this case, the support unit 180-1 may prevent the probe unit 120-1 from shaking inside the housing 110-1. Particularly in this case, the support unit 180-1 may be disposed at the center of the probe unit 120-1 in a longitudinal direction of the probe unit 120-1 and/or between ends of the housing 110-1. The support unit 180-1 may include an insulating material to electrically insulate the probe unit 120-1 from the housing 110-1. For example, the support unit 180-1 may include rubber, silicone, or the like.

The support unit 180-1 as described above may include at least one of a first support unit 181-1 disposed inside a first housing 111-1 to support a first probe rod 121-1 or a second support unit 182-1 disposed inside a second housing 112-1 to support a second probe rod 122-1.

The first support unit 181-1 may be disposed at the end of the first housing 111-1. In this case, the support unit 181-1 may protrude toward the inner surface of the first housing 111-1 from a portion of the first housing 111-1 in which a first through hole 111a-1 is formed. A fixing groove into which an end of the first probe rod 121-1 is inserted may be formed at a central portion of the first support unit 181-1. The groove of the first probe rod 121-1 may have a shape corresponding to the end of the first support unit 181-1.

Referring to FIG. 6, a first support unit' 181-1, which is another embodiment of the first support unit disposed at the end of the first housing 111-1, may have an end disposed at the end of the first housing 111-1 and the other end protruding toward the inner surface of the first housing 111-1, and a concave fixing groove 181-3 may be formed at a central portion of the protruding end of the first support unit' 181-1'. The fixing groove 181-3 may have a tapered or round shape. The other end of the first probe rod 121-1 is in close contact with the fixing groove 181-3, so that the first probe rod 121-1 can be fixed without shaking.

The first support unit' 181-1' may be made of an elastic material. In addition, the first support unit' 181-1 may preferably have a sufficient horizontal length and a groove arranged such that the fixing groove 181-3 can be pushed by the first probe rod 121-1 and contracted to the left direction (in the drawing). Accordingly, the first probe rod 121-1 may be supported by and in further close contact with the first support unit' 181-1'.

Referring to FIG. 7, the second support unit 182-1 may include a second support body unit 182a-1 formed in an annular shape. The second support body unit 182a-1 may have a through hole 182b-1 through which the second probe rod 122-1 is inserted and penetrates. The second probe rod 122-1 may be fixed through the through hole 182b-1 into which the second probe rod 122-1 is snuggly fit and the second support body unit 182a-1 which supports the inner wall of the second housing 112-1, and thus may not be shaken by vibration.

The second support body unit 182a-1 may have an air movement hole 182c-1 through which air moves. The air movement hole 182c-1 may be provided in plurality, and a plurality of air movement holes 182c-1 may be arranged to be spaced apart from one another.

The shape of the support unit 180-1 is not limited to the above examples, and may include all shapes that are disposed between the housing 110-1 and the probe unit 120-1 to support the probe unit 120-1. For example, the support unit 180-1 may be formed in a column shape or a ring shape.

When the support unit 180-1 is disposed as described above, less noise may be generated in the probe unit 120-1. Specifically, in a case where the probe unit 120-1 is formed in a cantilever shape as shown in FIG. 1, when the probe unit 120-1 is shaken, the potential of the electric field between the probe unit 120-1 and the housing 110-1 is changed, which may cause a microcurrent to be generated in the probe unit 120-1. In this case, such a microcurrent may act as noise on a signal measured by the probe unit 120-1, so that the signal measured by the probe unit 120-1 may not be accurate.

However, when the support unit 180-1 is disposed as described above, the probe unit 120-1 is not shaken and thus the probe unit 120-1 can measure an accurate signal. Accordingly, the radon measuring apparatus 100-1 may perform an accurate measurement.

FIG. 8 is a flowchart of a radon measuring method according to an embodiment of the present invention. The following description will be given with reference to FIGS. 1 to 7.

First, a user may determine filter types (fine filter and ultrafine filter) of the first and second filter units 150 and 160 according to the concentration to be measured among the radon concentration, the progeny concentration, and the combined concentration. In addition, the user may transmit the determined measuring method to the radon measuring apparatus 100 through an external device.

The transceiver unit 170 may receive a measurement method signal from the external device (S310).

The control unit 130 may manipulate the switching unit 190 in response to the received measurement method signal to turn on/off the electrical connection between the first and second probe rods 121 and 122 (S320). For example, when the measurement method signal indicates the first or third measuring method described above, the switching unit 190 may electrically connect the first and second probe rods 121 and 122. When the measurement method signal indicates the second measurement method described above, the switching unit 190 may insulate the first and second probe rods 121 and 122.

Meanwhile, the user may arrange the radon measuring apparatus 100 inside a building to measure radon. The first and second housings 111 and 112 may be disposed parallel to the floor of the building.

Air inside the building may be diffused into the first and second housings 111 and 112 through the first and second through holes 111 and 112. In this case, radon in the air may be diffused together with the air into the first and second housings 111 and 112.

Radon is a substance with a half-life of 3.8 days, and after radon decays, radon progeny may be produced. The radon progeny may be adsorbed on moisture or the like in the air, forming aerosol particles. The size of the aerosol particles becomes larger than that of radon.

For example, in the aforementioned second measurement method, radon and its progeny may be introduced into the first housing 111 through the first filter unit 150 which is a fine filter having large pores. The second filter unit 160, which is an ultrafine filter having small pores, can pass only radon among radon and its progeny. Accordingly, only radon may be introduced into the second housing 112.

When the air is injected into the first housing 111 and the second housing 112, the first probe rod 121 may measure the combined concentration of radon and its progeny and the second probe rod 122 may measure the radon concentration.

Specifically, when power is applied through the control unit 130, a bias voltage may be formed in the first and second housings 111 and 112 through the shielding unit 140 connected to the control unit 130. An electric field may be formed by the bias voltage between the first probe rod 121 and the first housing 111 and between the second probe rod 122 and the second housing 112. This electric field may range from approximately tens of volts to hundreds of volts.

When the electric field is formed as described above and radon or radon progeny decays, ion particles generated during alpha decay are accelerated by the electric field and move to the first and second probe rods 121 and 122, which causes the voltage or current of each of the first and second probe rods 121 and 122 to fluctuate, so that electrical signals may be generated (S330).

The electrical signal may be transmitted to the control unit 130, and the control unit 130 may measure the concentration of radon and its progeny by removing noise from the electrical signal. More specifically, the probe signal receiving module 131 may receive the electrical signal of the voltage or current fluctuations of the first and second probe rods 121 and 122 (S335). The probe signal receiving module 131 may amplify the received electrical signals. The noise cancellation module 133 may remove noise from the received electrical signals (S340).

The calculation module 135 may obtain the concentration of radon and/or the concentration of radon progeny, or the combined concentration of radon and its progeny based on the electrical signals from which noise is removed (S345).

In the case of the second measuring method, the control unit 130 may calculate the concentration of radon progeny from the radon concentration and the combined concentration.

The control unit 130 may compare a first concentration value through the first probe rod 121 and a second concentration value through the second probe rod 122 (S350).

The control unit 130 may determine whether there is an error by determining a difference between the first and second concentration values exceeds a preset value and comparing the measuring methods (S360). For example, when the first or third measuring method is set and the difference between the first concentration value and the second concentration value is greater than a first preset value, it may be determined that the measuring method is set erroneously. For another example, when the second measuring method is set and the difference between the first and second concentration values is smaller than a second preset value, it may be determined that the measuring method is set erroneously. In this case, the control unit 130 may transmit the error to the external device through the transceiver unit 170.

The first set value may be preferably smaller than the second set value. This is because the second set value, which is a range of error value used to determine whether different concentrations are measured, should be greater than the first set value, which is an error value used to determine whether the first and second concentration values are equal to each other.

Meanwhile, while the above operation is in progress, the shielding unit 140 may suppress the generation of noise in the control unit 130. In other words, the shielding unit 140 electromagnetically shields all or some modules of the control unit 130 to block the control unit 130 from being affected by static electricity, surge voltage, radio waves, etc. generated from the outside.

The radon measuring apparatus 100 according to the present invention is capable of measuring radon and radon progeny in the air through a simple structure. In addition, the radon measuring apparatus 100 may block the control unit 130 from external electromagnetic waves, thereby preventing the control unit 130 from malfunctioning.

The radon measuring apparatus 100 may check radioactive materials in real-time. In addition, the radon measuring apparatus 100 may separately measure the concentration of radon progeny produced during fission of radon as well as the concentration of radon.

The present invention may be implemented in hardware or in software. Also, the present invention may be implemented as computer-readable code stored in a computer-readable storage medium. That is, the present invention may be implemented in the form of a recording medium including computer executable instructions. A computer-readable medium may be any usable medium that can be accessed by a computer and may include all volatile and nonvolatile media and detachable and non-detachable media. Also, the computer-readable medium may include all computer storage media and communication media. The computer storage medium includes all volatile and nonvolatile media and detachable and non-detachable media implemented by a certain method or technology for storing information such as computer-readable instructions, data structures, program modules, or other data. The communication medium typically includes computer-readable instructions, data structures, program modules, other data of a modulated data signal such as a carrier wave, or other transmission mechanisms, and includes information transmission media. Also, functional programs, codes, and code segments for accomplishing the present invention can be easily construed by programmers skilled in the art to which the present invention pertains.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

REFERENCE NUMERALS 100,100-1: RADON MEASURING APPARATUS 110, 110-1: HOUSING
111,111-1: FIRST HOUSING 112,112-1: SECOND HOUSING
120,120-1: PROBE UNIT 121,121-1: FIRST PROBE UNIT
122,122-1: SECOND PROBE UNIT 130,130-1: CONTROL UNIT
130: CONTROL UNIT 140,140-1: SHIELDING UNIT
150: FIRST FILTER UNIT 160: SECOND FILTER UNIT
170: TRANSCEIVER UNIT 180-1: SUPPORT UNIT
181-1: FIRST SUPPORT UNIT 182-1: SECOND SUPPORT UNIT

The invention claimed is:

1. A radon measuring apparatus comprising:
a housing having two separate spaces and through holes formed such that each space communicates with the outside;
a probe unit having first and second probe rods which are respectively disposed inside each space in the opposite direction from each other inside the housing;
a control unit disposed inside the housing and connected to the probe unit; and
a switching unit for controlling the electrical connection between the first and second probe rods.

2. The radon measuring apparatus of claim 1, further comprising a shielding unit having the control unit accommodated therein to electrically shield the control unit and having a communication hole communicating with the outside,
    wherein the housing has a first housing having one end coupled to the shielding unit and the other end in which a first through hole is formed, and having the first probe rod disposed therein; and a second housing disposed symmetrically with the first housing with respect to the shielding unit, having one end coupled to the shielding unit and the other end in which a second through hole is formed, and having the second probe rod disposed therein.

3. The radon measuring apparatus of claim 2, further comprising a first filter unit disposed in the first through hole; and a second filter unit disposed in the second through hole,
    wherein any one of a fine filter having a pore size through which radon progeny passes and an ultrafine filter having a pore size smaller than the pore size of the fine filter and allowing radon to pass therethrough is installed on each of the first and second filter units according to a user's selection.

4. The radon measuring apparatus of claim 2, further comprising a transceiver unit configured to receive a measuring method in accordance with whether the fine filter or the ultrafine filter is installed on each of the first and second filter units from an external device,
    wherein the control unit is configured to set a measuring method to any one of a first measuring method in which a concentration of radon is measured, a second measuring method in which a concentration of radon and a combined concentration of radon and its progeny are each measured, and a third measuring method in which the combined concentration is measured, according to the received measuring method.

5. The radon measuring apparatus of claim 4, wherein, when the set measuring method is any one of the first and third measuring methods, the control unit is configured to control the switching unit to electrically connect the first and second probe rods, and when the set measuring method is the second measuring method, the control unit is configured to control the switching unit to electrically insulate the first and second probe rods.

6. The radon measuring apparatus of claim 4, wherein the control unit is configured to determine whether there is an error, based on a difference between a first concentration value calculated through the first probe rod and a second concentration value calculated through the second probe rod and the set measuring method.

7. The radon measuring apparatus of claim 6, wherein there is the error when the difference between the first and second concentration values is greater than a first set value and the set measuring method is one of the first and third measuring methods, or when the difference between the first and second concentration values is smaller than a second set value and the set measuring method is the second measuring method.

8. The radon measuring apparatus of claim 2, further comprising a support unit disposed inside the housing and configured to support the probe unit.

9. The radon measuring apparatus of claim 8, wherein the support unit comprises at least one of a first support unit having one end disposed at the end of the first housing in which the first through hole is formed, and the other end protruding toward the inside of the first housing, and having a fixing groove formed at a central portion of the protruding other end into which an end of the first probe rod is inserted, or a second support unit having an annular shape, a through hole through which the second probe rod penetrate, and a support body unit supporting an inner wall of the second housing.

10. A radon measuring method comprising:
    receiving a measuring method; and
    in accordance with the received measuring method, controlling the electrical connection between first and second probe rods which are respectively disposed inside first and second housings disposed on both sides of a shielding unit that accommodates a control unit therein and electrically shields the control unit.

* * * * *